United States Patent Office 3,092,601
Patented June 4, 1963

3,092,601
LATEX COATING COMPOSITIONS
Wilbur M. Sullivan, Bloomfield, and Leonard A. Carlson, Murray Hill, N.J., assignors to Union Carbide Corporation, a corporation of New York
No Drawing. Original application Oct. 1, 1959, Ser. No. 843,635, now Patent No. 3,047,523, dated July 31, 1961. Divided and this application Nov. 30, 1961, Ser. No. 156,163
13 Claims. (Cl. 260—29.6)

This invention relates to surface coating compositions and especially to novel polyvinyl acetate latex compositions which, when applied to base materials as a surface coating, will produce self-induced three dimensional effects. The invention further relates to articles of manufacture consisting of various base materials having on the surface thereof a decorative as well as protective coating derived from our novel coating compositions.

Latex coatings are now well known in the protective coatings field. The widespread utility of such coatings has been the result of intensive research and the consequent development of emulsion polymerization techniques which permit the polymerization or copolymerization of a variety of monomers to produce high molecular weight polymers having, in general, outstanding resistance properties and especial suitability for particular coatings uses. The fact that latex coating systems utilize water as the carrier or application medium results in tremendous economic savings and also enables the production of coatings compositions that are nontoxic, nonflammable and odorless. One of the further, more important advantages flowing from the use of latex systems is the ability to apply coatings at or above 50 percent solids content, by weight, and subsequently obtain dry films of the thickness normally desired in a protective coating with ordinary brush, spray, roller, dip or blade methods. The application consistency is independent of the molecular weight of the polymer in the latex and the consistency depends rather upon the composition of the exterior or aqueous phase. Adjustment of the consistency of the aqueous phase is generally achieved through the addition of minor amounts of water soluble or colloidally dispersible materials that are well known to those skilled in the art. A further advantage obtainable through the use of latex coating systems is the ability to apply uniform coatings to porous, normally absorbent substrata such as kraft paper. Latexes in general will not penetrate nor be absorbed in such substrata. This "hold out" characteristic is of special value in applying sealer coatings to plaster, wallboard, paper and textiles. The formulation techniques for latex based coatings useful on a wide variety of surfaces such as exterior masonry, interior plaster and gypsum board, paper, cloth, metal and other base materials has now advanced to the point where the effects of certain additives, e.g., pigments, fillers, plasticizers, filming agents, surface active agents and other modifiers are generally understood. As a result certain principles of compounding latexes are now generally accepted and latex systems successfully compete with established coating compositions in most of the fields in which coatings are now used.

A very significant exception to this general utility or adaptability of emulsion polymer compositions for surface coatings has existed, and continues to exist, in the field of self-textured coatings. As used in this application, the term "self-textured coatings" is to be construed as meaning coatings or surface finishes which develop patterns or textured appearances during the drying cycle which patterns or textured appearances give the effect of being three dimensional when viewed by the human eye. These effects, as implied by the term "self" are the direct result of forces developed within the coating composition itself rather than the result of any external manual or mechanical operations upon the coating either during or after the application of the coating composition to the base material. Although certain such effects have previously been achieved using solvent based coatings, there are to our knowledge no water based coating compositions employing non-homogeneous or polyphase dispersions, such as synthetic latex polymer compositions, which will form such self-induced three dimensional effects when applied to the surface of the base material which is to be protected and simultaneously decorated.

A further significant exception to the general utility of latex compositions as surface coatings has existed in the field of finishes containing metallic pigments. For example, in coatings pigmented with metallic aluminum powder or flakes, non-latex systems have been necessitated since the aluminum would react with any water present and hydrogen would be evolved. Similar problems exist when other powdered or flaked metallic pigments, e.g., powdered copper, bronze, brass, zinc, etc. are used. This problem, insofar as aluminum pigments are concerned, has recently been solved by methods described in U.S. Patent 2,858,230 to Knoll et al. This patent relates in general to special methods of preparing a metallic aluminum-containing pigment which may be used in water based paints, i.e., latex coating compositions. Similar methods, modified as described hereinafter, enable the manufacture of self-texturing coatings compositions containing metallic pngments such as bronze, brass, copper, etc., in lieu of aluminum; when such is desired.

The desirability of having self-induced pattern forming coating compositions based on the use of an aqueous vehicle or film former (that is, self-texturing latex coating compositions) becomes immediately apparent when one considers the inherent advantages of such compositions such as those previously mentioned, i.e., low application consistency which is not dependent upon the molecular weight of the polymer within the latex and excellent "hold out" on porous substrata such as paper and paper board, as well as other advantages such as the greatly increased freedom from the fire hazards and toxicity problems generally involved when resin solution coating compositions are utilized. In addition there is the further advantage that no curing or oxidation of the applied film is required when water based coating compositions are used since drying in this case is a simple matter of allowing the volatiles to escape from the film. Such can be accomplished by a nominally brief heating at elevated temperatures after the coating has been applied and the pattern has formed. For example, heating for about two minutes at about 250° F. will normally be sufficient to dry the coating. This speed of drying is admirably suited to the processing schedules of present commercial paper coating equipment and is moreover highly desirable in cases where the requirement for quick drying is not so demanding. Pattern finishes derived from latex coating compositions also offer other distinct advantages over the conventional solvent type pattern forming coating compositions such as, for example, the resistance to oxidation, ultra violet light degradation, and to the action of greases, oils and alkalis obtainable when a polyvinyl acetate latex is utilized.

It is therefore a primary object of this invention to provide novel self-texturing water based coating compositions and methods by which the same may be prepared. It is a further object of this invention to provide methods for applying our novel latex coating compositions to the base surface of a base material so as to form a self-induced three-dimensional, patterned finish on said surface; which finish may then be finally dried. It is a further object to provide an article of manufacture having a patterned surface coating derived from the novel coating composition of this invention.

In general, the coating composition of this invention is comprised of the following ingredients or components in the indicated proportions, each of which will be further defined hereinafter:

|  | Parts by weight | |
|---|---|---|
|  | Typical | Operable range |
| A. Polyvinyl acetate latex | 100 (non-volatile basis). | 100 (non-volatile basis). |
| B. Pattern forming agent | 80 | 20-100. |
| C. When desired: Aqueous dispersion of non-leafing metallic powder. | 22 (non-volatile basis). | 15-50 (non-volatile basis). |

A. *Polyvinyl acetate latex.*—We have found that the objects of this invention may be accomplished only through the use of a polyvinyl acetate latex having certain specific properties as indicated hereinafter.

B. *Pattern forming agent.*—The pattern forming agent is a liquid organic material preferably having a relatively fast evaporation rate and preferably strongly hydrophobic in character.

C. *Aqueous dispersion of non-leafing metallic powder (when desired).*—Dispersions of powdered aluminum prepared as taught by Knoll et al., U.S. Patent 2,858,230 and treated with an ammonium phosphate in order to obtain storage stability are desirably used in the practice of this invention. Similar dispersions wherein powdered bronze, brass, copper, etc., are directly substituted for the aluminum may also be used. The use of a metallic powder as pigment in my novel compositions of matter is preferred because of the very pleasing decorative effects which may be thereby obtained.

Other materials well known in the surface coating art may also be added, e.g., fillers, pigments and other colorants, thickening agents, etc. These further optional additives must not be strongly acidic or strongly basic. The principle and underlying criteria on the use of these further optional additives are that the latex emulsion must not be broken and the aluminum powder must not be attacked, nor its protective phosphate coating removed.

The essential characteristics and properties of the ingredients in our novel self-texturing latex coating composition are as follows:

A. POLYVINYL ACETATE LATEX

The polyvinyl acetate latex required for the practice of this invention contains a homopolymer prepared by emulsion polymeric action, said polymer having an average particle size range of 0.75 to 3.0 microns. The emulsifying agents and stabilizers employed for polymerization are chosen with certain limitations in mind. The preferred emulsifier is a nonionic type, while the preferred stabilizer or protective colloid is hydroxyethyl cellulose. Methods of preparing the polymer containing latexes are well known in the art. For the purposes of our invention the combination of emulsifier and protective colloid is balanced so as to result in a latex of a vinyl acetate polymer having a particle size range of about 0.75 to 3.0 microns; said latex having a non-volatile content of 45–65 percent (preferably 57–60 percent) by weight, a surface tension of at least 48 dynes/cm. (preferably at least 52 dynes/cm.) and a pH of about 4 to about 8 (preferably 4 to 6). Residual monomer content within the acceptable commercial limits, i.e., less than about 1%, is satisfactory. The presence of strongly anionic emulsifiers and protective colloids will tend to prevent pattern formation. When these components are strongly alkaline, and a powdered metallic pigment is used, a stable, non-gassing system may not be obtainable. The property which appears to be most dominant is the surface tension. Latexes having a surface tension of not less than 48 dynes/cm. and preferably not less than 52 dynes/cm. are essential for the satisfactory practice of this invention. Example 1 (below) clearly illustrates the importance of this factor. Latexes containing polyvinyl acetate copolymerized with up to 20% of another vinyl monomer may also be used if the necessary requirements noted above are fulfilled.

B. A PATTERN FORMING AGENT

The pattern forming agent of our invention is a liquid organic material which evaporates at a rapid rate and thus produces the driving force or energy for self-induced pattern formation. The organic liquids used for this purpose are preferably strongly hydrophobic, i.e., practically insoluble in water.

In our copending application S.N. 843,634, filed on even date herewith, we have disclosed and claimed pattern forming agents useful in preparing self-texturing coatings compositions which, when applied to various substrata, form "hammered" effect coatings upon said substrata. In order to obtain this effect, pattern control agents are necessary, as well as pattern forming agents.

For the purposes of the instant invention, herein disclosed and claimed, pattern control agents are not necessary. The compositions produced by following the teachings of this invention will yield decorative self-induced, patterned finishes when applied to the surfaces of various substrata, but will not yield hammertone finishes. The most important pattern forming agents used in the practice of this invention are the unsubstituted medium boiling range (about 110° C. to about 200° C.) liquid aliphatic hydrocarbons and those mixtures of unsubstituted aliphatic hydrocarbons commonly known as mineral spirits which have boiling points within this same range. Also useful are the ethyl silicates which, as shown in Example 4 below, aid in the production of a highly desirable fine dot pattern of obvious wide utility. It is to be especially noted that lower boiling aliphatic hydrocarbons (Examples 7 to 9) are not useful for producing self-textured coatings from latex compositions. Similarly, hydrophilic materials are not useful (see Examples 5 and 6).

The amount of pattern forming agent used in the practice of our invention is in the range of from about 20 parts to 100 parts by weight for every 100 parts by weight of polyvinyl acetate solids in the latex base.

C. AQUEOUS DISPERSION OF NON-LEAFING METALLIC POWDER

Although the use of a metallic pigment is not necessary for the practice of this invention, it is preferred that such pigments be incorporated in our coating composition because of the very pleasing decorative effects thereby obtainable.

We have found that only certain specific types of metallic pigments may be used if the self-texturing coating composition of our invention are to be obtained. A particularly useful metallic pigment is powdered aluminum, and the methods by which it may be satisfactorily used will be described as exemplary.

The aforementioned Knoll et al. patent describes generally the proper use of aluminum pigments in latex coating compositions. However, the teachings of this patent and the modifications suggested therein result only in latex coating compositions which when applied to the surface of a base material or substrata give smooth finishes. Satisfactory self-textured finishes are not obtained when the patentees' suggestions are completely and fully followed.

A non-leafing grade of aluminum powder is a necessary ingredient of the dispersion used for this invention. For example, aluminum powders having a negligible leafing value are especially adaptable for the purposes of this invention whereas aluminum powders having approximate leafing values of 55 percent and 60 percent have no value in the preparation of self-texturing latex coating compositions.

Aqueous dispersions of aluminum powder suitable for the practice of this invention may be prepared by methods known to the art. The general formula of a dispersion suitable for this invention is as follows, all parts being parts by weight:

| | Parts |
|---|---|
| Water | 65 |
| Diammonium hydrogen phosphate | 1.1 to 1.7 |
| Non-ionic surfactant | 0.45 to 0.90 |
| Aluminum powder | 35 |

The preparation of these aqueous dispersions is basically as follows: Dissolve the diammonium hydrogen phosphate and the surfactant in water making sure that the surfactant is completely dispersed by allowing to stand for approximately 10 minutes, then add the aluminum powder. A normal mixing time required for completely dispersing the aluminum powder within the solution should be approximately another 10 minutes. Be sure that none of the dry pigment remains un-wetted by the phosphate solution. The aluminum paste thus prepared should be permitted to age for 24-48 hours in a loosely covered container before mixing with the water based binder (e.g. polyvinyl acetate latex). This period is necessary to insure sufficient time for the phosphate to react completely with the aluminum to form a barrier coat which renders the aluminum passive.

In practicing this invention, we have found that mono basic and dibasic ammonium phosphates are of equal utility. An ammonium phosphate must be used as the stabilizing agent in our invention. Other phosphates, e.g. tetrasodium pyrophosphate, known to be especially effective as a pigment dispersing agent, do not produce a passive aluminum dispersion, even when used in conjunction with an ammonium phosphate.

Any suitable non-ionic surfactant may be used. For the purposes of this invention the only criterion for determining suitability of the surfactant is that it should not markedly reduce the surface tension of the coating composition and thus tend to prevent patern formation. Tergitol TMN (trimethyl nonyl ether of polyethylene glycol) has been found quite satisfactory for the purposes of this invention in aiding the wetting out of the aluminum powder without preventing or adversely affecting pattern formation in the applied coating. Other suitable surfactants will be apparent to those skilled in the art, or may be easily determined by routine check tests to determine the effect of said surfactants on the surface tension of the coating composition.

The dispersing techniques heretofore described may be varied to some extent without departing from the basic necessity of passivating the aluminum. The ratio of water to aluminum may be varied over a considerable range and the amount of phosphate stabilizing agent may be increased to about twice the amount above specified without any ill effects. The 24–28 hour aging period may be reduced to about 12 hours or less (as little as one hour if found necessary), but aging periods of less than about 10 hours are usually found to result in increased difficulties insofar as stability of the powdered metal dispersion is concerned. Aging periods may also be increased to several weeks without affecting the desired result of self-induced textured patterns in the applied coating. For best overall results it is preferred to age the metallic pigment dispersion for at least 24 hours before further processing.

It should be reemphasized that pigment dispersions containing powdered metals other than aluminum may also be prepared and used in the practice of this invention. In all cases, the powdered metal used must be of non-leafing quality, and an ammonium phosphate stabilizer must be used. Example 11 below shows the preparation of a self-texturing coating composition containing, as a direct substitute for aluminum, a non-leafing grade of bronze powder. Other metallic powders, e.g., copper, brass, etc. may be similarly used.

It should also be reemphasized that although the use of a metallic pigment is preferred, self-induced pattern effects may also be obtained using the basic composition described above with the powdered metal and ammonium phosphate entirely omitted. Alternatively, we may substitute for the powdered metal other pigments such as flake mica (approximately 160 mesh) or rutile titanium dioxide without materially affecting the type of self-textured coating finally obtained.

D. OTHER ADDITIVES

The use of hydrophobic compounds may be resorted to for the production of discontinuous films which yield attractive decorative effects when applied over a background of contrasting color. Such compounds include oleic acid, cetyl alcohol and mineral or lubricating oils. Also useful for this purpose are aromatic hydrocarbons and chlorinated aliphatic hydrocarbons. Certain proprietary compounds, such as Triton X–45 and Ucon Lubricant LB–285 may be used in conjunction with the above materials to aid in the development of specific effects. Triton X–45 is a non-ionic surface active agent having a chemical formula and structure of:

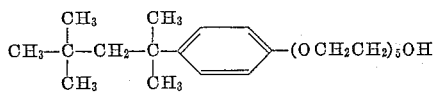

and made by reacting t-octyl phenol with ethylene oxide. Ucon LB–285 is a monobutyl ether of polypropylene glycol having a 100° F. viscosity of approximately 285 SUS (Saybolt Universal seconds). Additives to combat acidity and confer poor wetting characteristics can also be used.

A plasticizer for the resin may be used to increase the flexibility of the coating where necessary for the use intended. Ordinarily up to 15 percent, based on the weight of the latex solids, of any suitable compound recognized as an effective plasticizing agent for polyvinyl acetate, e.g., dibutyl phthalate, tricresyl phosphate, etc., may be added. The plasticizer may be added by stirring into the latex before compounding the coating composition of this invention but preferably is added by stirring into the coating composition after the latex has been added. Pre-emulsification of the plasticizer may be used where necessary to achieve a finely divided dispersion of plasticizer types which resist stir-in addition.

Control of application consistency is achieved by adding a water solution of hydroxyethyl cellulose. Other thickeners suitable for latex systems such as natural gums (e.g. guar gum), modified starches and methyl cellulose may be used. Colloidal clays, bentonite clay and alkaline polyacrylates will tend to give gassing problems and therefore should not be used in our latex coating composition. It is believed that these latter compounds are unsatisfactory because they selectively absorb or otherwise remove and disperse the passivating and stabilizing phosphate layer on the aluminum particles.

E. COLORING EFFECTS

In order to obtain certain decorative effects it may frequently be desirable to incorporate pigments or other colorants in our latex coating composition. We have, for example, prepared a suitable chromium oxide coloring composition by wetting 65 parts by weight of chromium oxide pigment with a solution of 1.3 parts of a nonionic surfactant (e.g., alkyl phenyl ether of polyethylene glycol known as Tergitol NPX) in 35 parts by water. When this colorant dispersion is added to our polyvinyl acetate latex coating composition in various amounts ranging generally from about 0.2 to 10% or more by weight of dry color, based on the total composition, there are produced self-textured hammer finishes having a very attractive green tint, with the color depth corresponding roughly to the quantity of colorant added. Similarly, other commercially produced aqueous pulp and paste colors can be used if routine check tests give assurance that the dispersants used to prepare these color dispersions are not detrimental to the stability of the aqueous dispersion of metallic powder (when used) and are not sufficiently active to effectively reduce the surface tension of the polyvinyl acetate latex and thus prevent the development of the self-induced pattern effects in the final coating, as previously explained. Principal types of color pigments have been found to be satisfactory including oxides, phthalo cyanine blues and greens, carbon black, Hansa yellow and toluidine red. When using a composition containing a metallic pigment the amount of colorant ordinarily used is from about 0.2 to 1.0% by weight of dry color based on the weight of the total composition. In a composition for producing nonmetallic finishes up to 10% or more by weight of dry color may be used to obtain any certain desired shade of color in the coating as applied.

The preferred method for applying the self-texturing latex coating composition of our invention is by spraying from an ordinary paint spray gun operating in the normal 30 to 60 p.s.i. range. Blade coating methods and dip coating techniques have been used satisfactorily to produce self-induced hammer effects from the latex coating composition of the invention herein described. Interesting textures and patterns can be obtained by using roller coating devices. It is interesting to note however that in this case the roller type paint applier used in ordinary household painting does not create a finish having a self-induced hammer effect while machine roller type coaters are quite satisfactory. This difference in results is most probably explained by the fact that machine rollers have smooth surfaces and are not constructed of the fibrous materials such as the lamb's wool, nylon fluff, etc. used in making household-type paint rollers. In normal operation, therefore, machine rollers lay down a smooth film of uniform thickness even when used in applying materials of poor leveling ability; whereas the manual household-type roller lays down a very rough textured wet film and can only be used with paints having very good leveling qualities.

The following specific examples are given to further illustrate the practice of this invention. It is understood that these examples are merely illustrative of the practice of our invention and are not to be construed as limiting the scope of this invention other than as defined in the appended claims.

*Example 1*

In this example a series of coating compositions were prepared to show the effect of surface tension of the polyvinyl acetate latex upon the ability of the latex coating composition to form self-textured coatings. In this test the following standard formula was used.

| Ingredient | Pounds | Gallons |
| --- | --- | --- |
| Non-leafing aluminum powder | 37.41 | 1.80 |
| Polyvinvyl Acetate Latex (58% non-volatiles) | 297.72 | 32.01 |
| Water | 318.84 | 38.23 |
| Tri cresyl Phosphate Plasticizer | 8.63 | 0.88 |
| Apcothinner [1] | 136.65 | 18.87 |
| Hydroxyethyl Cellulose (7.5% non-volatile solution) | 19.55 | 2.30 |
| Trimethyl Nonyl ether of Polyethylene Glycol (Tergitol TMN) | 0.91 | 0.11 |
| Monobasic Ammonium Phosphate | 1.12 | 0.07 |
| Totals | 820.83 | 94.27 |

NOTE.—The total composition is based on 100% by weight.

[1] Medium boiling Range (117–142° C.) aliphatic hydrocarbons: Paraffins—53%; also contains napthenes—35% and (i.e. cycloaliphatics); aromatics—12%.

In order to prepare the latex coating compositions the manufacturing procedure was as follows:

First: The aqueous dispersion of non-leafing aluminum powder was prepared by adding the various components to a paint mixer sequentially in the following order: 40% of the water from the above standard formula, ammonium phosphate, non-ionic surfactant (e.g. trimethyl nonyl ether of polyethylene glycol), and the non-leafing aluminum powder. Agitation was continuous during each addition and each component was thoroughly dispersed before the next was added. The aluminum paste was then allowed to age for a period of 24 hours before it was incorporated in the latex coating composition.

Second: The latex coating composition (i.e., the paint) was prepared by mixing the following ingredients in the order named: aluminum paste (prepared by the above procedure), polyvinyl acetate latex, tricresyl phosphate plasticizer, remainder (i.e., 60%) of the water in the above standard formula hydroxyethyl cellulose solution, and finally Apcothinner (pattern forming agent).

A number of commercially available polyvinyl acetate latexes and polyvinyl copolymer latexes were incorporated in the above noted standard formula, following the procedure as set forth immediately above in each instance. Results were as follows:

TABLE I

[Effects of surface tension upon the ability of resin latexes to form self-textured coating finishes]

| Polymer | Surface Tension (dynes/cm.) | Pattern |
| --- | --- | --- |
| I. Homopolymers: | | |
| Commercial Resin A | 35.9–38.5 | No Pattern. |
| Commercial Resin B | 52 | Irregular Islands. |
| Commercial Resin C | 39.5 | No Pattern. |
| II. Copolymers: | | |
| Commercial Copolymer D | 37.8 | Do. |
| Commercial Copolymer E | 42.6 | Do. |
| Commercial Acrylic Copolymer | 44.6 | Do. |

The data of Table I is self-explanatory, clearly illustrating the extreme importance of using a polyvinyl acetate latex having a surface tension of at least about 48 dynes/cm. and preferably at least 52 dynes/cm.

*Example 2*

The latex coating composition of Example 1 containing commercial resin B in the standard formulation was sprayed on card stock using an ordinary paint spray gun operating at 30–80 p.s.i. The coating was then dried for two minutes in a 250 °F. oven. An attractive, continuously repeating, irregular island patterned finish was produced.

*Examples 3 and 4*

These examples give illustrations of other pattern forming agents useful in our invention. In these examples the standard formulation and manufacturing procedures of Example 2 were used to prepare several self-texturing polyvinyl acetate latex coatings compositions with the exception that the pattern forming agents shown in Table II below were directly substituted for the Apcothinner used in Example 2. Results were as follows, with the data for Apcothinner repeated for comparison.

TABLE II

| Example | Agent | Concentration (Parts/100 Parts polyvinyl acetate solids in latex) | Pattern | Boiling Point of Agent, °C. |
| --- | --- | --- | --- | --- |
| 2 | Apcothinner | 100 | Irregular Islands. | 117–142 |
| 3 | Varsol [1] | 100 | do | 161–197 |
| 4 | 40% Ethyl Silicate Aqueous Solution. | 100 | Fine Dot Structure. | 168 |

[1] Medium boiling range aliphatic hydrocarbons.

In similar fashion, novel latex coatings compositions utilizing unmixed liquid aliphatic hydrocarbons boiling between about 110–200° C. in lieu of the Apcothinner of Example 2, may be prepared, which compositions will form self-induced patterned finishes when applied to the surface of various substrata.

*Examples 5–9*

These examples are included solely to give illustrations of materials unsatisfactory for use as pattern forming agents in the practice of my invention. In these examples the materials listed below were directly substituted for the Apcothinner used in Example 2. None of compositions containing the listed materials yielded a regular pattern when applied to card stock as described in Example 2.

| Example | Agent | Boiling Point of Agent in ° C. |
| --- | --- | --- |
| 5 | Ethyl Acetate | 77.2 |
| 6 | Isopropyl Alcohol | 82.4 |
| 7 | Hexane | 68.7 |
| 8 | Heptane | 92 |
| 9 | Isooctane | 99.2 |

*Example 10*

In this example, the pattern forming agent consisted of a mixture of Apcothinner and toluene in a weight ratio of 1:3. The latex coating composition containing this agent when applied to card stock as described in Example 2 gave a novel discontinuous self-textured coating, but the continuously repeating pattern of Example 2 was no longer present.

*Example 11*

Direct substitution of non-leafing bronze powder for the non-leafing aluminum power in Example 2 gave a coating composition which when supplied to the surface of a base material gave a very decorative gold-colored self-induced pattern similar to that obtained in Example 2.

*Example 12*

This example is the same as Example 2 with the exception that 5% by weight (based on the total latex coating composition) of a 25% water dispersion of copper phthalocyanine green was added, an attractive and decorative green tinted patterned effect similar to that of Example 2 was produced.

The self-texturing coating compositions of this invention are useful in decorating all types of surfaces made from a wide variety of materials including metal, wood, paper, fiber stocks, cloth and plaster. Coated materials produced according to the teachings of this invention are useful for numerous manufactured articles such as, for example, cabinets, office furniture, manufacturing equipment and housings therefor, wrapping papers, wallpaper, ceiling tile, wall boards and other wall covering material.

Polyvinyl acetate latex coating compositions which produce self-textured coatings according to the teachings of this invention are believed to represent a very desirable advance in the art of pattern finish formulation in that water is the primary vehicle for the coating materials. Excellent control and reproducibility of pattern type and size has been achieved. Storage of exemplary formulations for periods of six months or more has resulted in no significant change in the ability of these compositions to develop the same self-induced patterns observed when the compositions were used immediately after original preparation. The addition of aqueous dispersions of pigment and other colorants may be achieved by simple stir-in mixing techniques and permits the production of self-textured coatings having a wide range of colors and tints without the necessity of resorting to milling or grinding operations.

The present application is a division of copending application Serial No. 843,635, filed October 1, 1959, now Patent 3,047,523, issued July 31, 1961.

We claim:
1. A polyvinyl acetate latex composition for producing self-induced textured coatings consisting essentially of:
    (a) a polyvinyl acetate latex having: a non-volatile content of from about 45 to about 65 percent by weight, a surface tension of at least about 48 dynes/cm., a pH within the range of from about 4 to about 8, and wherein the said polyvinyl acetate has a particle size of from about 0.75 to about 3.0 microns; and
    (b) for every 100 parts by weight of polyvinyl acetate solids in said latex from about 20 to about 100 parts by weight of a liquid aliphatic hydrocarbon having a boiling point in the range of from about 110° C. to about 200° C.

2. A polyvinyl acetate latex composition for producing self-induced textured coatings consisting essentially of:
    (a) a polyvinyl acetate latex having: a non-volatile content of from about 57 to about 60 percent by weight, a surface tension of at least about 52 dynes/cm., a pH within the range of from about 4 to about 6, and wherein the said polyvinyl acetate latex has a particle size of from about 0.75 to about 3.0 microns; and
    (b) for every 100 parts by weight of polyvinyl acetate solids in said latex from about 20 to about 100 parts by weight of a liquid aliphatic hydrocarbon having a boiling point in the range of from about 110° C. to about 200° C.

3. A polyvinyl acetate latex composition for producing self-induced textured coatings consisting essentially of:
    (a) a polyvinyl acetate latex having: a non-volatile content of from about 45 to about 65 percent by weight, a surface tension of at least about 48 dynes/cm., a pH within the range of from about 4 to about 8, and wherein the said polyvinyl acetate has a particle size of from about 0.75 to about 3.0 microns;
    (b) for every 100 parts by weight of polyvinyl acetate solids in said latex from about 20 to about 100 parts by weight of a liquid aliphatic hydrocarbon having a boiling point in the range of from about 110° C. to about 200° C.; and,
    (c) for every 100 parts by weight of polyvinyl acetate solids in said latex, from about 15 to about 50 parts by weight, based on the solids content thereof, of a stable aqueous dispersion of a non-leafing metallic powder, said dispersion containing ammonium phosphate as the sole stabilizing agent.

4. A polyvinyl acetate latex composition for producing self-induced textured coatings consisting essentially of:
    (a) a polyvinyl acetate latex having: a non-volatile content of from about 45 to about 65 percent by weight, a surface tension of at least about 48 dynes/cm., a pH within the range of from about 4 to about 8, and wherein the said polyvinyl acetate has a particle size of from about 0.75 to about 3.0 microns; and
    (b) for every 100 parts by weight of polyvinyl acetate solids in said latex from about 20 to about 100 parts by weight of mineral spirits having a boiling point range of from about 110° C. to about 200° C.

5. A composition as defined in claim 4 wherein the said mineral spirits contain about 53 percent by weight paraffins and have a boiling point range of from about 117° C. to about 142° C. and wherein the amount of said mineral spirits is about 100 parts by weight for every 100 parts by weight of said polyvinyl acetate solids.

6. A polyvinyl acetate latex composition for producing self-induced textured coatings consisting essentially of:
    (a) a polyvinyl acetate latex having: a non-volatile content of from about 45 to about 65 percent by weight, a surface tension of at least about 48 dynes/cm., a pH within the range of from about 4 to about 8, and wherein the said polyvinyl acetate has a particle size of from about 0.75 to about 3.0 microns;

(b) for every 100 parts by weight of polyvinyl acetate solids in said latex about 100 parts by weight of mineral spirits boiling in the range of from about 117° C. to about 142° C. and containing about 53 percent paraffins.

(c) for every 100 parts by weight of polyvinyl acetate solids in said latex from about 15 to about 50 parts by weight, based on the solids content thereof, of a stable aqueous dispersion of a non-leafing metallic powder, said dispersion containing ammonium phosphate as the sole stabilizing agent.

7. A polyvinyl acetate latex composition for producing self-induced textured coatings consisting essentially of:
 (a) a polyvinyl acetate latex having: a non-volatile content of from about 45 to about 65 percent by weight, a surface tension of at least about 48 dynes/cm., a pH within the range of from about 4 to about 8, and wherein the said polyvinyl acetate has a particle size of from about 0.75 to about 3.0 microns;
 (b) for every 100 parts by weight of polyvinyl acetate solids in said latex about 100 parts by weight of mineral spirits boiling in the range of from about 117° C. to about 142° C. and containing about 53 percent paraffins; and
 (c) for every 100 parts by weight of polyvinyl acetate solids in said latex from about 15 to about 50 parts by weight, based on the solids content thereof, of a stable aqueous dispersion of non-leafing aluminum powder, said dispersion containing ammonium phosphate as the sole stabilizing agent.

8. A polyvinyl acetate latex composition for producing self-induced textured coatings consisting essentially of:
 (a) a polyvinyl acetate latex having: a non-volatile content of from about 45 to about 65 percent by weight, a surface tension of at least about 48 dynes/cm., a pH within the range of from about 4 to about 8, and wherein the said polyvinyl acetate has a particle size of from about 0.75 to about 3.0 microns;
 (b) for every 100 parts by weight of polyvinyl acetate solids in said latex about 100 parts by weight of mineral spirits boiling in the range of from about 117° C. to about 142° C. and containing about 53 percent praffins; and
 (c) for every 100 parts by weight of polyvinyl acetate solids in said latex from about 15 to about 50 parts by weight, based on the solids content thereof, of a stable aqueous dispersion of non-leafing bronze powder, said dispersion containing ammonium phosphate as the sole stabilizing agent.

9. A polyvinyl acetate latex composition for producing self-induced textured coatings consisting essentially of:
 (a) a polyvinyl acetate latex having: a non-volatile content of from about 57 to about 60 percent by weight, a surface tension of at least about 52 dynes/cm., a pH within the range of from about 4 to about 6, and wherein the said polyvinyl acetate has a particle size of from about 0.75 to about 3.0 microns;
 (b) for every 100 parts by weight of polyvinyl acetate solids in said latex about 100 parts by weight of mineral spirits boiling in the range of from about 117° C. to about 142° C. and containing about 53 percent paraffins; and
 (c) for every 100 parts by weight of polyvinyl acetate solids in said latex about 22 parts by weight, based on the solids content thereof, of a stable aqueous dispersion of non-leafing aluminum powder, said dispersion containing ammonium phosphate as the sole stabilizing agent.

10. A polyvinyl acetate latex composition for producing self-induced textured coatings consisting essentially of:
 (a) a polyvinyl acetate latex having: a non-volatile content of from about 57 to about 60 percent by weight, a surface tension of at least about 52 dynes/cm., a pH within the range of from about 4 to about 6, and wherein the said polyvinyl acetate has a particle size of from about 0.75 to about 3.0 microns;
 (b) for every 100 parts by weight of polyvinyl acetate solids in said latex about 100 parts by weight of mineral spirits boiling in the range of from about 117° C. to about 142° C. and containing about 53 percent paraffins; and
 (c) for every 100 parts by weight of polyvinyl acetate solids in said latex about 22 parts by weight, based on the solids content thereof, of a stable aqueous dispersion of non-leafing bronze powder, said dispersion containing ammonium phosphate as the sole stabilizing agent.

11. An article of manufacture comprising a base material having on the surface thereof a self-induced textured coating, said coating being the residue produced by applying the composition of claim 1 to said surface and drying.

12. An article of manufacture comprising a base material having on the surface thereof a self-induced patterned coating, said coating being the residue produced by applying the composition of claim 3 onto said surface and drying.

13. An article of manufacture comprising a base material having on the surface thereof a self-induced textured coating, said coating being the residue produced by applying the composition of claim 4 onto said surface and drying.

References Cited in the file of this patent

UNITED STATES PATENTS

| | | |
|---|---|---|
| 2,508,092 | Beynon | May 16, 1950 |
| 2,858,230 | Knoll et al. | Oct. 28, 1958 |